United States Patent

Fischer et al.

[11] Patent Number: 5,254,317
[45] Date of Patent: Oct. 19, 1993

[54] DEVICE FOR GENERATING OZONE

[75] Inventors: Melchior Fischer, Lieli; Paul Köstinger, Regensdorf, both of Switzerland

[73] Assignee: Ozonia AG, Zurich, Switzerland

[21] Appl. No.: 669,939

[22] Filed: Mar. 15, 1991

[30] Foreign Application Priority Data

Mar. 28, 1990 [CH] Switzerland ............ 1023/90

[51] Int. Cl.⁵ ............................................. B01J 19/12
[52] U.S. Cl. ............................ 422/186.18; 422/186.07
[58] Field of Search ............... 422/186.18, 186.21, 422/186.3, 186.07

[56] References Cited

U.S. PATENT DOCUMENTS

| | | | |
|---|---|---|---|
| 3,671,417 | 6/1972 | Louboutin | 204/320 |
| 4,232,229 | 11/1980 | Tanaka et al. | 250/541 |
| 4,654,199 | 3/1987 | Gloor et al. | 422/186.18 |
| 4,656,010 | 4/1987 | Leitzke et al. | 422/186.18 |
| 4,725,412 | 2/1988 | Ito | 422/186.19 |
| 4,886,645 | 12/1989 | Fischer et al. | 422/186.18 |
| 4,908,189 | 3/1990 | Staubach | 422/186.19 |
| 5,034,198 | 7/1991 | Kaiga et al. | 422/186.07 |
| 5,116,582 | 5/1992 | Cooper et al. | 422/186.3 |
| 5,145,653 | 9/1992 | Fischer et al. | |

Primary Examiner—Donald P. Walsh
Assistant Examiner—David L. Jenkins
Attorney, Agent, or Firm—Oblon, Spivak, McClelland, Maier & Neustadt

[57] ABSTRACT

In an ozone generator, spring elements (5) of metal pointing transversely to the longitudinal direction of the tube are provided for spacing the dielectric (3) from the metallic outer electrode (1). These spring elements are either bonded directly to the dielectric (3) and are stuck onto a tape-shaped carrier which is attached to the dielectric (3) and at their free ends rest against the inside wall of the outer electrode (1). In this manner, the discharge gap is only minimally constricted and the assembly of the inner tubes (2a, 2b) is simplified.

9 Claims, 4 Drawing Sheets

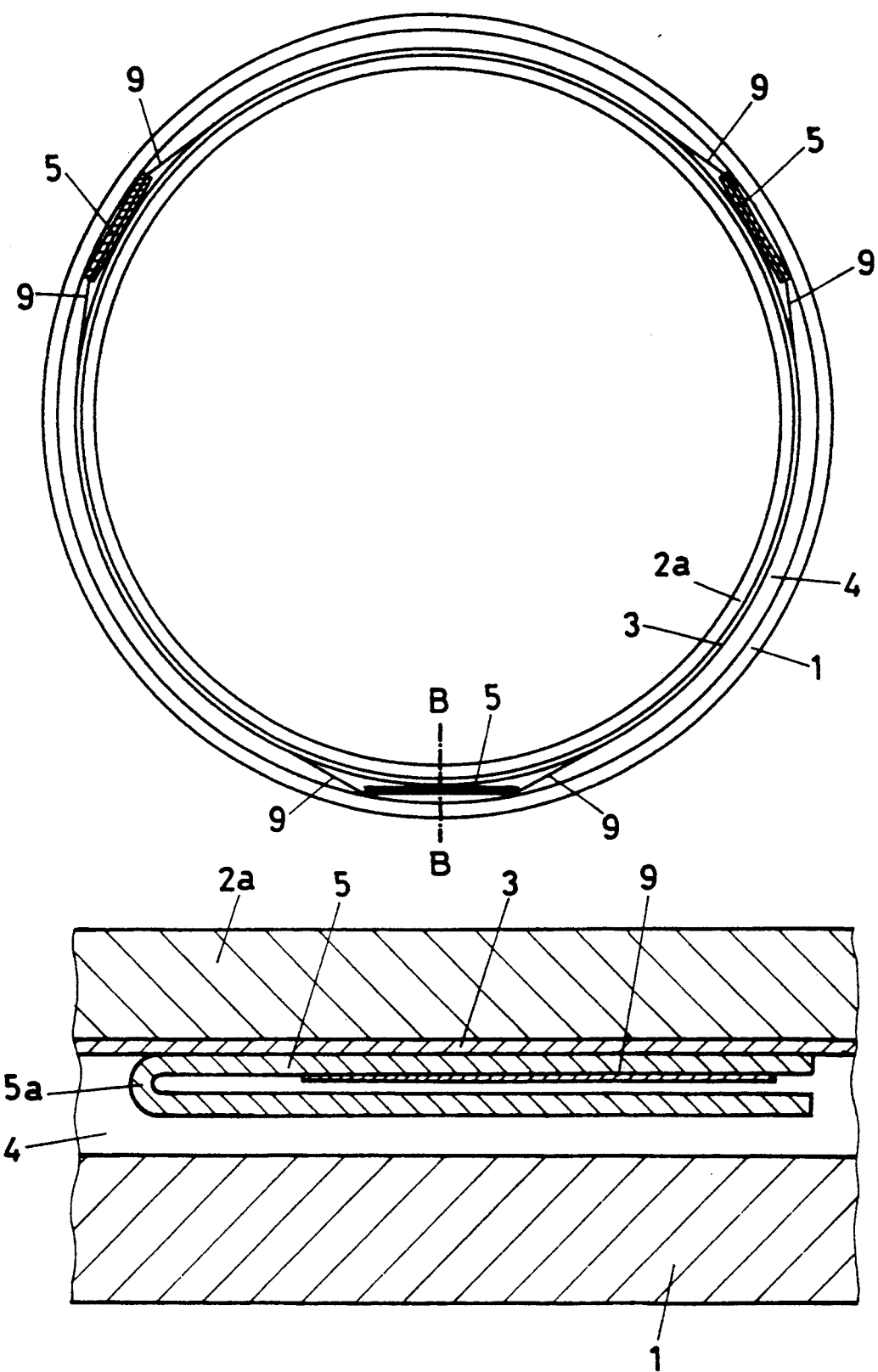

FIG.5a
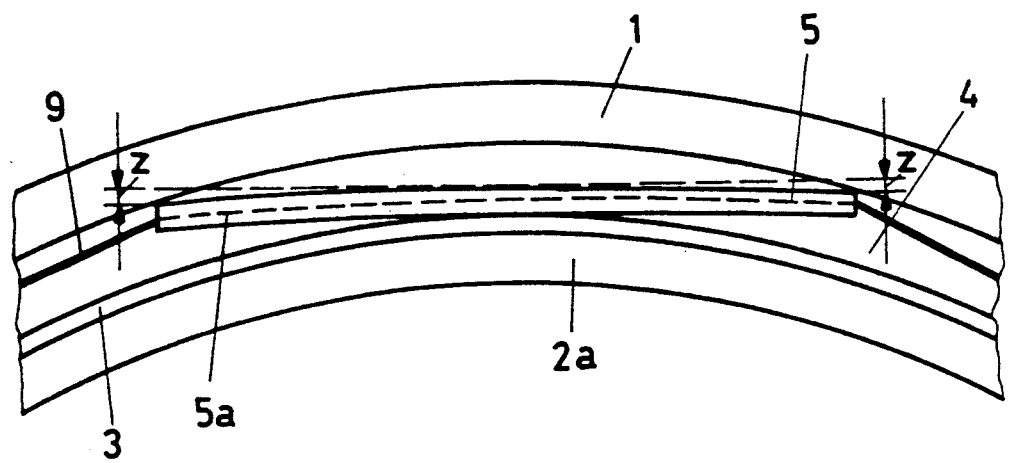
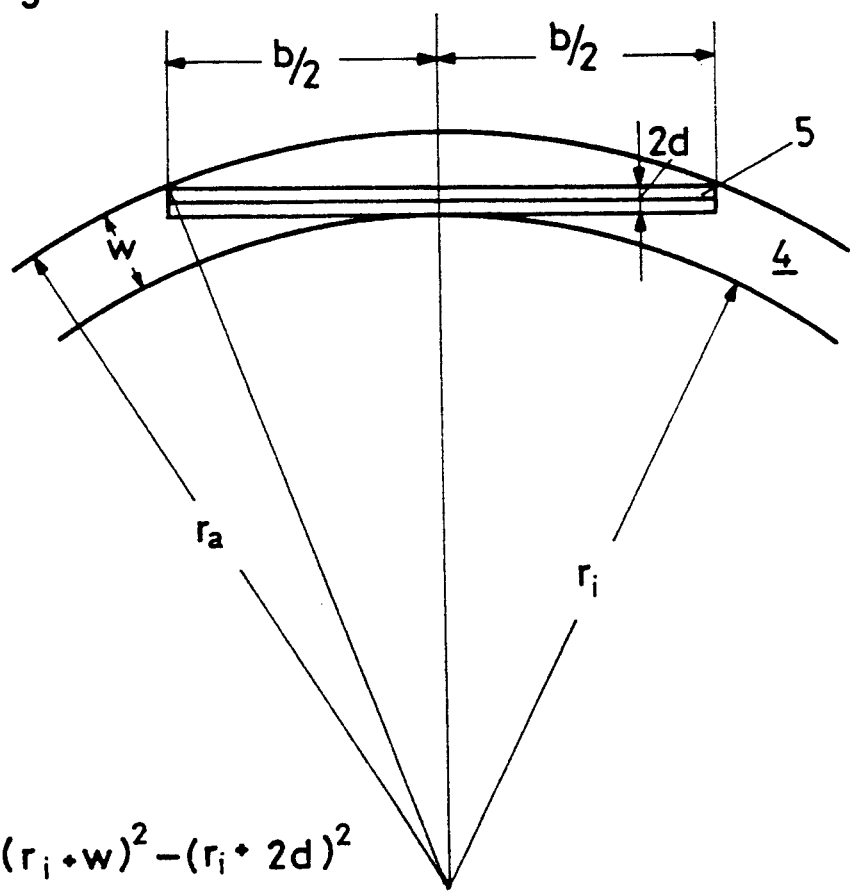
$$(b/2)^2 = (r_i + w)^2 - (r_i + 2d)^2$$
FIG.5b

DEVICE FOR GENERATING OZONE

BACKGROUND OF THE INVENTION

1. Field of the Invention

The invention relates to a device for generating ozone from oxygen or an oxygen-containing gas by silent electric discharges in a discharge gap through which the gas flows and which is essentially formed by a tubular outer electrode and an inner electrode concentrically surrounded by the outer electrode, a dielectric which separates the electrodes from one another being arranged in the discharge gap, and metallic spring elements being provided for spacing the dielectric from the outer electrode.

In this connection, the invention refers to a prior art as can be found, for example, in French Patent Specification 2,424,874.

2. Discussion of Background

Ozone is a very strong oxidant for organic substances and for inorganic compounds which contain elements having several oxidation numbers. Apart from a large variety of applications in chemistry, it has been used for decades in water conditioning. However, the high investment and operating costs for ozone generation restrict the possible applications.

Although, theoretically, there are many possibilities of generating ozone, it has hitherto only been ozone generation by silent electric discharge which, in practice, has gained any significance.

In contrast to plate-type ozone generators, problems of ensuring accurate spacing of the electrodes arise in the case of tube-type ozone generators. This is caused mainly by dimensional deviations of the tube diameters and by bending.

In German Offenlegungsschrift 3,422,989 a possibility of ensuring accurate concentric coordination between inner electrode, dielectric and outer electrode is described. The spacers described and shown there consist of a plastic band bonded in spiral form to the inner electrode. Apart from the spacing, the spiral application results in an increase in the gas velocity and improves cooling.

As a rule, these bands consist of polytetrafluoroethylene (Teflon). Plastic bands, particularly those of polytetrafluoroethylene, however, tend to flow during the operation of the ozone generator so that they cannot fulfill their spacing function to the desired extent. In addition, their stability in the discharge is inadequate.

From French Patent Specification 2,424,874, an ozone generator is known in which the dielectric tube is spaced apart from the outer metal tube by means of spring tongues which are joined integrally to a carrier slotted in the longitudinal direction of the tube. Carrier and spring tongues consist of an elastic ozone-resistant metal. With the currently used gap widths of 1 millimeter and less, these spacing elements narrow the discharge gap and thus impede the flow of the operating gas. Because, on the one hand, a minimum spring effect of the tongues and, on the other hand, a fixing of the carrier on the dielectric tube or in the outer metal tube must be ensured, the thickness of the carrier material and thus of the spring tongues cannot be made arbitrarily small. Furthermore, the spring characteristics of the spring tongues are highly dependent on their geometry. The smallest deviations from the predetermined angle at which the spring tongues are bent out of the carrier influence the spacing. Moreover, the installation of the dielectric tubes provided with the spacing elements or, respectively, the insertion of the dielectric tubes into the metal tubes equipped with said elements requires complicated assembly aids.

SUMMARY OF THE INVENTION

Starting from the prior art, the invention is based on the object of creating a device for generating ozone in which the geometry of the discharge gap, particularly its concentricity, is maintained after a prolonged operating time, the spacing elements constrict the discharge gap as little as possible and the dielectric tubes can be assembled without complicated assembly aids.

According to the invention, this object is achieved by the fact that the metallic elements are metal springs which are preferably uniformly distributed over the circumference of the discharge gap and which are attached to a non-metallic carrier or directly to the dielectric tube, the free ends of the metallic spring elements pointing essentially tangentially with respect to the dielectric surface and resting against the inside wall of the outer electrode.

The advantage of the invention can be seen, in particular, in that—for example in contrast to the ozone generator according to French Patent Specification 2,424,874—the discharge gap is constricted only as far as absolutely necessary. The carrier is only an assembly aid. For this reason, it can also consist of a material which is not resistant to ozone and/or discharge attack. The spring element, which essentially only acts tangentially, exerts an accurately defined spring force in a simple manner. It is accurately given by its width and can be influenced within wide limits and adapted to the respective gap geometries by choice of the material, the thickness and its geometry. In comparison with the conventional spring elements in tongue form, there is accordingly also no need to ensure that the geometry of the tongues is accurately maintained.

The number and spring stiffness of the spring elements and their spatial distribution can be adapted in a simple manner to the weight and the installed position of the tubes. In this manner, the weight of the dielectric tubes can also be compensated by increasing the number and/or the distribution and/or the spring characteristics of the spring elements located at the bottom and/or by their geometry, especially in the case of horizontal-axis ozone generators.

A particularly simple embodiment of the invention provides for the construction of the spring elements as narrow folded metal strips which are directly bonded to the dielectric tube which can be done, for example, by means of a thin double-sided adhesive tape. The adhesive bond in this arrangement is only necessary as an assembly aid since it loses its effect under the action of the ozone generated in operation. For this reason, it is advantageous to construct the spring elements in such a manner that they retain their predetermined position after the dielectric tubes have been assembled in the metal tube.

In another embodiment, the folded spring elements are stuck onto a tape provided with adhesive on one side, preferably a polyimide tape, having a length which is a little shorter than the circumference of the dielectric tube, and this tape is applied to the dielectric tube.

In the text which follows, the invention will be explained in greater detail with reference to illustrative embodiments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a cross section through an ozone generator comprising a different embodiment of the spacing with folded spring elements according to FIG. 3a attached to a one-sided adhesive tape;

FIG. 5a shows an enlarged section of the lower spring element from FIG. 3;

FIG. 5b shows a sketch for explaining the relationship between gap width and width of the spring element;

DESCRIPTION OF THE PREFERRED EMBODIMENTS

Figure 1:
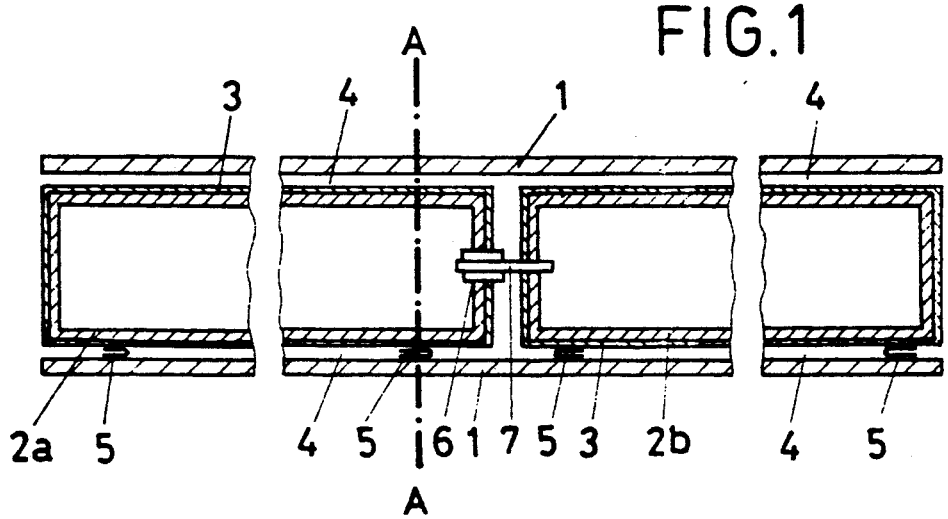
FIG. 1 shows a longitudinal section through an ozone generator with enamel dielectric, onto which folded spring elements according to the enlarged detailed drawing according to FIG. 1a are bonded.
Figure 2:
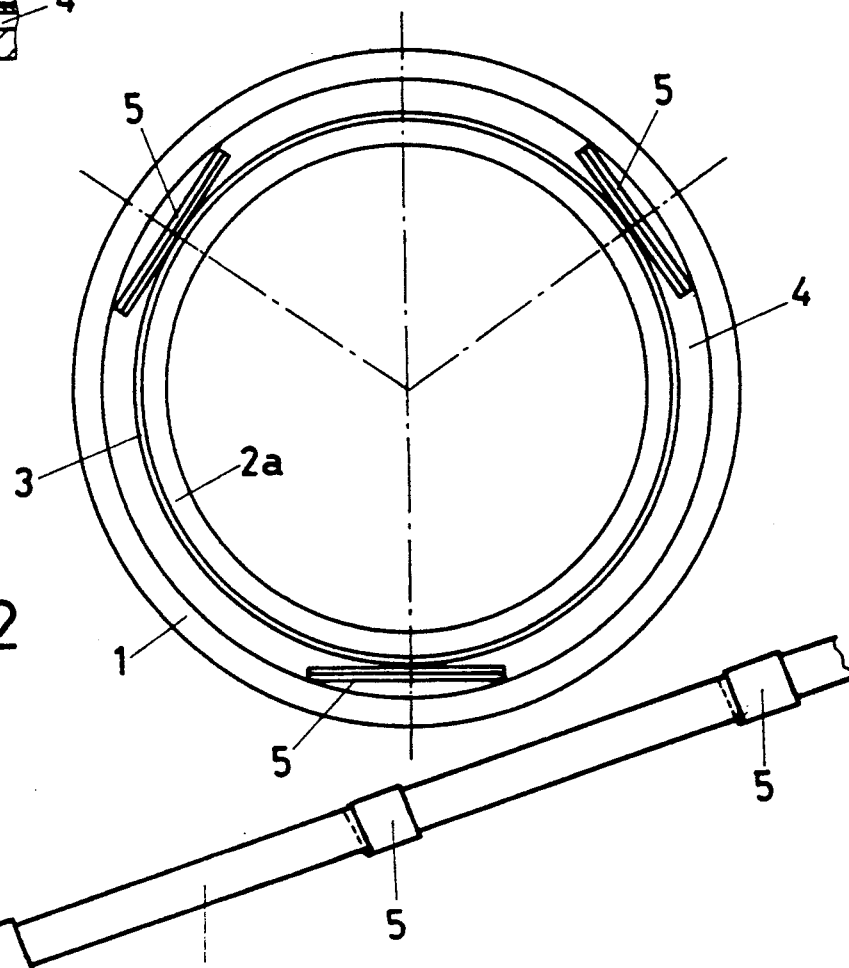
FIG. 2 shows a cross section through the ozone generator according to FIG. 1 along its line AA on an enlarged scale.
Figure 4:
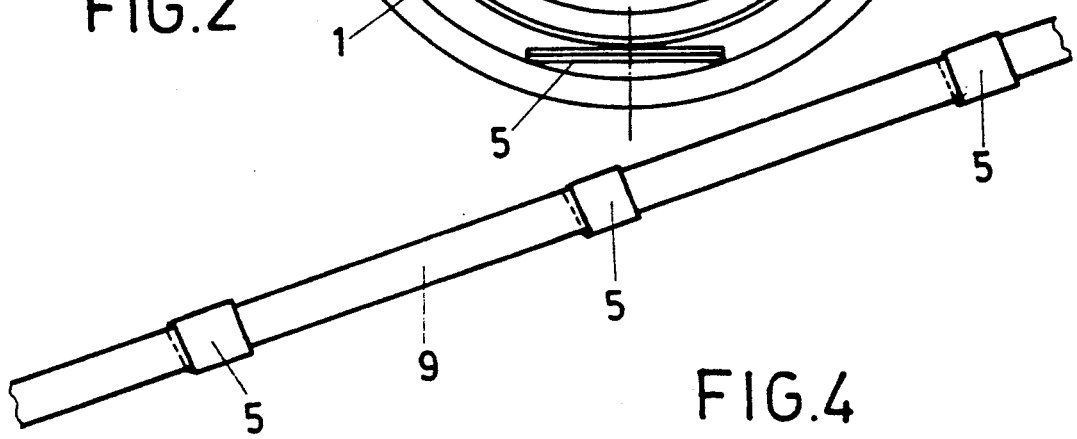
FIG. 4 shows a perspective view of an adhesive tape according to FIG. 3 comprising spring elements before the application to the dielectric tube.

Referring now to the drawings, wherein like reference numerals designate identical or corresponding parts throughout the several views, the ozone generator in accordance with FIGS. 1 and 2 consists of an outer metal tube 1 which forms the first electrode connected to ground potential, two inner metal tubes 2a, 2b which form the second electrodes. In the case of the example, the dielectric consists of an enamel layer 3 of some 100 μm thickness, applied to the outside of the inner metal tubes 2a, 2b. For the spacing of the two tubes 1 and 2a and 2b, respectively, three spring elements 5 each are provided at axially spaced-apart points in the discharge gap 4. These elements are arranged in the vicinity of the tube ends and are uniformly distributed over the circumference (compare FIG. 2). In the case of relatively short inner tubes, spring elements 5 are in each case only provided at both tube ends and in the case of relatively great lengths also in the central tube section. In a typical ozone generator having an inside diameter of the outer electrodes of 60 mm and a discharge gap of 0.5 mm, they consist of stainless spring steel strips with a width of 7 to 8 mm and a thickness of about 0.1 mm which are bent over with a sharp angle in the center and have an approximate length of 6 to 7 mm in the folded condition.

The ends of the spring elements 5 associated with the inner metal tube 2a all point into one and the same direction and thus allow one inner tube 2a to be inserted without problems (from left to right in the case of the example) into the outer tube 1. The spring elements associated with the other inner tube 2b, which tube must be inserted into the tube 1 (from right to left in the case of the example), are oppositely directed by comparison so that here, too, the inner tube 2b can be inserted without problems into the outer tube 1. The inner tubes 2a and 2b, which form the inner electrodes (connected to high-voltage potential), are electrically connected to one another by a contact device at their inner end faces. For this purpose, the tube 2a is provided with a central bushing 6 which acts in conjunction with a central contact pin 7 at the inner end face of the tube 2b.

Figure 1A:
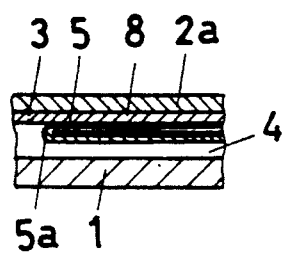

The shape of the spring elements 5 and their attachment to the enamel layer 3 of the inner tubes can be seen in the detailed drawing of FIG. 1a. They are attached to the enamel layer 3 by means of a thin one-sided or double-sided adhesive tape 8 (FIG. 1a). Instead of a double-sided adhesive tape, the spring elements 5 can also be attached by means of an adhesive, for example epoxy-based or silicone rubber-based adhesive. In both cases, it is not important that the tape or the adhesive is ozone-resistant since both are only used as assembly aid.

In the section enlargement according to FIG. 1a, it can also be seen that the fold 5a is spaced apart from the attachment point of the spring element 5 to the inner tube 2a. The spring element there rests directly on the inner tube 2a. By contrast, the free ends of the spring element 5 rest against the inside wall of the outer tube 1 which can be achieved in every case by means of the dimensioning of the width of the spring element.

The spring characteristics of the spring elements and their shape also secure their position should the adhesive layer 8 or the adhesive be destroyed under discharge or ozone attack.

Instead of spring elements directly bonded to the inner tube 2a or 2b, respectively, the former can be stuck onto a carrier 9 and temporarily attached there. This is illustrated by way of example in FIGS. 3 or 3a, respectively. In this connection, a polyimide tape for example can be considered as a carrier, with a width which approximately corresponds to 70 to 80% of the axial length of the folded spring elements (approximately 7 to 8 mm). The underside of the tape 9 is provided with a thin adhesive layer which is also used for temporarily attaching the stuck-on spring elements 5. The length of the tape is slightly less than the circumference of the inner tubes 2a and 2b, respectively. The mutual distance of the spring elements 5 on the tape 9 is dimensioned in such a manner that the symmetric distribution in the discharge gap according to FIG. 3 is achieved.

The tape prepared in this manner is applied to the inner tube 2a and 2b, respectively, at the predetermined places. Attention must also be paid to the fact that the free ends of the spring elements of a tube point in one direction, that is to say to the outside when inserting the tube into the outer metal tube 1.

The width of the spring elements 5 is dependent on the width of the discharge gap 4 and on the outside diameter of the inner tube 2a and 2b, respectively, for the reasons described above. Using simple geometric relations (FIG. 5b), this width b is obtained from the relation $$b^2 > 4[(r_i+w)^2 - (r_i+2d)^2]$$

where $r_i$ is half the outside diameter of the inner tube 2a and 2b, respectively, d is the thickness of the spring element 5 and w is the gap width of the discharge gap 4. It is usually sufficient to increase the value for b calculated from the above relation by 10%. The bending z (FIG. 5a) of the spring element 5 in the installed condition is then sufficient for building up enough spring force for fulfilling the spacing and support function allocated to it.

Figure 6C:
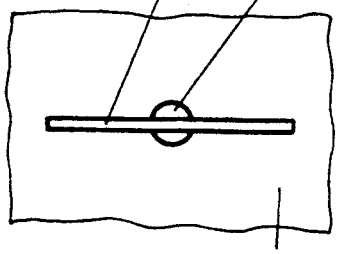
FIGS. 6a, b, c, d, e, and f show a diagrammatic overview of alternative spring elements.
Figure 6D:
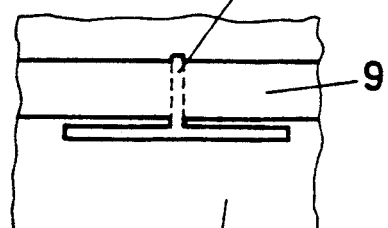
Figure 6B:
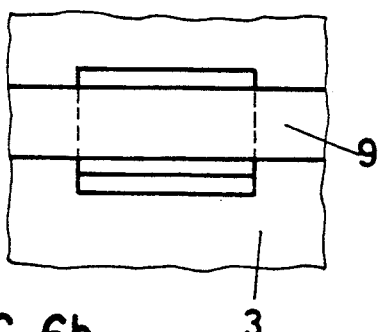
Figure 6E:
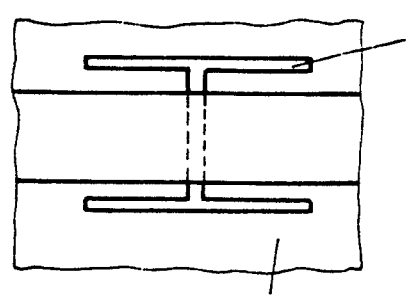
Figure 6A:
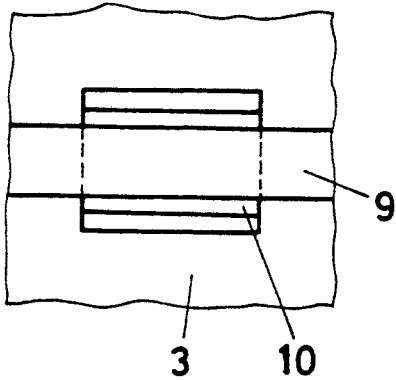

Apart from spring elements in the form of small metal plates bent over at a sharp angle, a number of alternative spring elements as shown in FIGS. 6a to 6f are possible without leaving the context of the invention. They all follow the teaching according to the invention:

According to FIG. 6a, the spring element is a small metal plate 10 which is bent over at a sharp angle at both ends so that folds 10a and 10b are produced. FIG. 6b shows a variant having only one fold 10 at one end. In both cases, the attachment to the inner tube 3 is effected by means of a tape 9 analogously to FIG. 3a. Naturally, here, too, the possibility of attachment in accordance with FIGS. 1 and 2 by means of a double-sided adhesive tape or by means of adhesive exists.

Figure 6F:
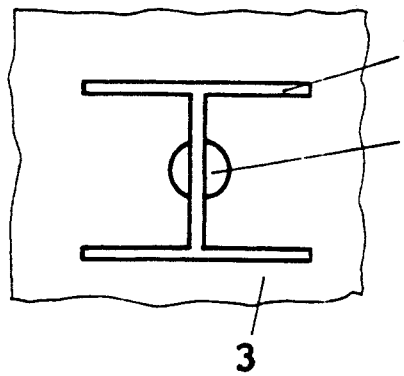

FIG. 6c illustrates the possibility of attaching a spring element in the form of a spring wire piece 11 directly to the dielectric 3 by means of a drop of adhesive 12. According to FIG. 6d, attachment over a larger area is possible if the spring element is a spring wire piece 13 bent in the form of a T. The tape 9 then overlaps the center part not used for spacing. FIGS. 6e and f show variants with spring elements 14 constructed in the form of an H, which are attached to the dielectric 3 either by a tape 9 (FIG. 6e) or a drop of adhesive 12 (FIG. 6f). With regard to the statements following FIGS. 6a, 6b, 6e and 6f, it must be noted that these spring elements essentially retain their position in the discharge gap 4 even after omission of the means of attachment (tape 9 or adhesive 12). This holds true, particularly, if the cutting edges pointing towards the outer tube 1 are left with sharp edges because these edges claw sufficiently well into the (metallic) wall of the outer metal tube 1 and can only slip in the circumferential direction of the tube even in the case of vibrations.

In the case of ozone generators with vertical axis, the distribution and the spring characteristics of the spring elements are uniform, that is to say, for example, all three spring elements 5 in FIGS. 1 and 2 are constructed in the same manner with respect to one another and are uniformly distributed in the circumferential direction.

In the case of horizontal-axis (prone) ozone generators, care must be taken to compensate the inherent weight of the inner tubes 2 in the interests of identical gap width in the circumferential and longitudinal direction of the tube.

This can be achieved, for example, by the fact that the width of the spring elements 5 located at the bottom is greater than the width of the spring elements located at the top.

When the spring elements are of equal width everywhere in the circumferential direction, the inherent weight of the inner tubes 2a, 2b can also be compensated by means of a higher number of spring elements 5 located at the bottom.

Figure 7:
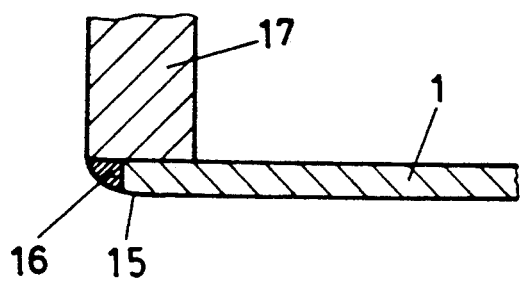
FIG. 7 shows an embodiment of a circumstantial bezel of the outer meal tube.

Because a slight bending of the free spring ends is necessary during the assembly of the inner tubes 2a, 2b in all embodiments described, it is advantageous to provide the ends of the outer metal tubes 1 according to FIG. 7 with a circumferential bezel 15 or chamfering. This facilitates the installation of the inner tubes 2a, 2b and does not mean any significant extra effort during the welding-in of the metal tubes 1 in the tube bottom 17 (FIG. 7).

The spacing arrangements described have been described and represented with the example of an ozone generator having an enamel dielectric. Naturally, ozone generators with quartz, glass or ceramic dielectric can also be provided with such spacing arrangements. Naturally, the spacing described above is also suitable for ozone generators in which the dielectric or its carrier is not subdivided in the longitudinal direction of the tube. In this case, the alignment of the spring elements is the same over the entire tube length.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for generating ozone from oxygen or an oxygen-containing gas by silent electric discharges in a discharge gap through which the gas flows, comprising:
   a tubular outer electrode and an inner electrode concentrically surrounded by the outer electrode,
   a dielectric which separates the electrodes from one another arranged in the discharge gap, and
   metallic spring elements provided for spacing the dielectric from the outer electrode, said metallic spring elements having free ends pointing essentially tangentially with respect to the dielectric surface and resting against the inside wall of the outer electrode.

2. The device as claimed in claim 1, wherein the spring elements rest directly on the dielectric with their central section.

3. The device as claimed in claim 1 or 2, wherein the spring elements consist of folded sheet metal strips, the lateral ends of the fold resting against the outer electrode, the central section of the fold resting against the dielectric and the point of attachment on the dielectric being spaced apart from the support point.

4. The device as claimed in claim 1 or 2, wherein the spring elements consist of straight or bent spring wire.

5. The device as claimed in claim 1, wherein at least three spring elements per radial plane are provided, one spring element being arranged at the lowest point in the discharge gap in the case of horizontal-axis tubes whilst the remaining spring elements are located approximately symmetrically with respect to the vertical plane of symmetry.

6. The device as claimed in one of claims 1 or 2, wherein the spring elements are attached to the dielectric by means of an adhesive or a double-sided adhesive tape.

7. The device as claimed in one of claims 1 or 2, wherein the spring elements are applied to a tape-shaped non-metallic carrier which is attached to the dielectric.

8. The device as claimed in claim 7, wherein the carrier consists of polyimide and is attached to the dielectric by means of an adhesive layer.

9. The device as claimed in one of claims 1 or 2, wherein, in the case of horizontal-axis tubes, at least one of the number the distribution the spring travels, and the spring characteristic of the spring elements is arranged in such a manner that the inherent weight of the inner tubes supported by them is compensated.

* * * * *